United States Patent [19]
Venturi

[11] 4,453,921
[45] Jun. 12, 1984

[54] METHOD AND DEVICE FOR POSITIONING AND FIXING THE STATIC CONVERGENCE CORRECTION UNIT ON THE NECK OF A COLOR TELEVISION TUBE

[75] Inventor: Adriano Venturi, Montrouge, France

[73] Assignee: Videocolor, Montrouge, France

[21] Appl. No.: 416,407

[22] Filed: Sep. 9, 1982

[30] Foreign Application Priority Data

Sep. 16, 1981 [FR] France ................................ 81 17520

[51] Int. Cl.³ ............................................. H04N 5/645
[52] U.S. Cl. ....................................... 445/23; 358/248
[58] Field of Search ...................... 445/23, 36; 358/248

[56] References Cited

U.S. PATENT DOCUMENTS 2,456,399 12/1948 Gethmann ........................... 358/248
2,544,875 3/1951 Bennett ............................... 358/248
2,643,373 6/1953 Morris ................................. 358/248
4,030,126 6/1977 Puhak ................................. 358/248
4,261,017 4/1981 Branton ............................... 358/248
4,338,584 7/1982 Howard ............................. 358/248

FOREIGN PATENT DOCUMENTS 528230 4/1952 Belgium .
2306522 4/1976 France .
55-137650 10/1980 Japan ..................................... 445/23

*Primary Examiner*—Kenneth J. Ramsey
*Assistant Examiner*—Kurt Rowan
*Attorney, Agent, or Firm*—Pollock, Vande Sande and Priddy

[57] ABSTRACT

At least one elastic collar is mounted in extension around the neck of a color television tube and behind the deflection yoke. A static convergence correction unit in the form of a cylindrical ring is placed around the neck with a predetermined clearance. The ring is slidably fitted over the elastic collar or collars which are thus compressed when the ring has been placed in the desired position. This permits suppression of an air-gap and accurate positioning of the ring on the neck of the tube.

8 Claims, 7 Drawing Figures

METHOD AND DEVICE FOR POSITIONING AND FIXING THE STATIC CONVERGENCE CORRECTION UNIT ON THE NECK OF A COLOR TELEVISION TUBE

This invention relates to a method for positioning and fixing the static convergence correction unit on the neck of a color television tube. The invention also relates to a device for carrying out said method.

It is known that, in color television tubes, three guns are mounted at the rear end of the tube in a so-called neck region. The three guns project three electron beams each corresponding to one of the three blue, green or red colors of the luminophor or phosphor dots of corresponding color which are struck by the electrons projected by their respective guns. In addition, the deflection system which controls scanning by the beams in order to form the image is mounted on the path of said beams at the rear end of the tube and at a short distance from the electron guns. However, the first necessary adjustment consists in causing the three beams to strike the center of the phosphor screen of the tube when no deflection is applied to the beams. This adjustment is performed in the conventional manner by means of the static convergence correction unit which is constituted by a plurality of small magnets, the interfering magnetic fields of which make it possible to carry out the desired adjustment. This correction unit is usually placed just behind the deflection yoke of the tube. Operations which consist in placing and accurately positioning the correction unit on the tube as well as associated adjustment and maintenance operations present difficult problems which can be solved in a simple and economical manner by means of the present invention.

In the prior art, the static convergence correction unit could be constituted by a number of different adjustable unitary elements which were fixed by bonding, for example, behind the deflection yoke of the tube. This method is not only time-consuming but also difficult to apply on an industrial scale and does not make it possible to carry out adjustments in a flexible manner.

In another method of the prior art, a ring usually consisting of plastic material filled with ferrite is placed behind the deflection yoke. The ring can be magnetized in the most suitable manner in order to obtain the desired static convergence corrections. Should provision be made for a split ring, it is fastened to the neck of the tube by means of an external metallic clamping collar. Adjustment operations are not very easy to perform since magnetization of the ring cannot take place when the metallic clamping collar is in position. Furthermore, the fact that the ring is split also introduces an air-gap which is not conducive to good adjustment.

In another known technique, the ring of plastic material filled with ferrite is not split, thus eliminating the air-gap problem. On the other hand, this introduces an awkward problem of accurate positioning of said ring on the neck of the tube, taking the manufacturing tolerances into account, especially in regard to the glass of the tube and the relatively large and variable gap which exists between the walls of the tube neck and of the static convergence correction unit. This axial gap is unfavorable from the point of view of adjustment and also in regard to fastening of the ring on the neck of the tube.

In accordance with the invention, the difficulties mentioned above are solved by the fact that at least one and preferably two elastic collars are placed on the neck at the rear end of the tube and behind the deflection yoke. Said collars are mounted in extension around said neck and have a small thickness of the order of 1 to 2 millimeters, for example. The static convergence correction unit is designed in the form of a cylindrical ring and slidably fitted over said two collars. The internal diameter of said cylindrical ring is chosen so as to be capable of engaging on said neck with a predetermined clearance and to compress said elastic collars when the correction unit is brought to the desired position on said neck above said collars, thus ensuring accurate positioning of said correction unit on the neck of the tube.

It is apparent that positioning of the correction unit is thus considerably facilitated. Moreover, it is no longer necessary to employ any additional component in order to fix the correction unit on the neck of the tube after it has been placed in position.

According to a further distinctive feature of the invention and taking into account the method of positioning explained in the foregoing, the desired magnetization of the static convergence correction unit is carried out when said unit is in position on the neck of the tube, with the result that this operation is facilitated and can readily be carried out on an industrial scale.

The device for the practical application of the method according to the invention comprises a static convergence correction unit essentially composed of a closed cylindrical ring of ferrite-filled plastic material having an internal diameter which is slightly larger than the external diameter of the neck of the tube to be equipped with said ring, at least one and preferably two elastic collars of heat-resistant elastomeric material such as silicone rubber having a diameter in the state of rest which is smaller than the external diameter of the neck and having a small cross-section of approximately one to two millimeters. In the position in which it is mounted on the tube, said correction unit thus forms part of the device according to the invention and is positioned on the neck of the tube over said elastic collars which are compressed between the oppositely-facing walls of said unit and of said neck.

Other features of the invention will be more apparent upon consideration of the following description and accompanying drawings, wherein.

Figure 1:
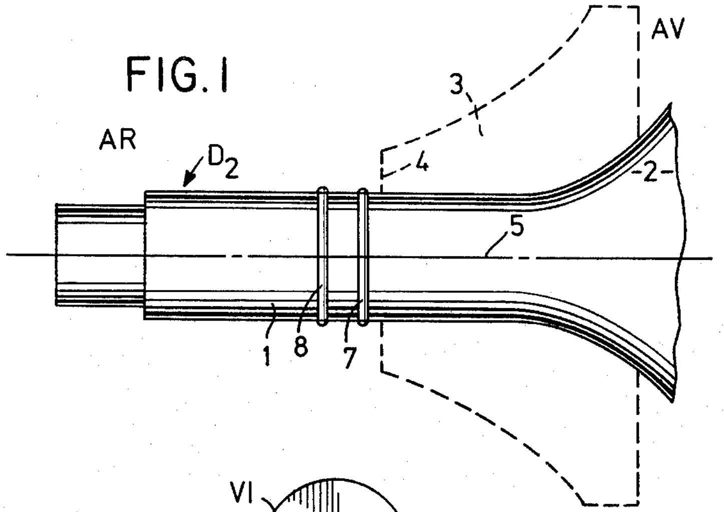
FIG. 1 is a schematic cutaway view in elevation showing the rear portion of a television tube on which the device according to the invention is placed.

Referring first to FIG. 1, there is shown the rear portion or neck 1 of a color television tube 2 on which the deflection yoke 3 is mounted in any known manner. The outer contour of the deflection yoke is shown in dashed outline in this figure whereas FIGS. 2 and 3 show only the rear face 4 of said yoke, the static convergence correction unit being intended to be mounted against said rear face and slightly ahead of the electron guns (not shown) which are located within the neck at the rear end of the tube In FIG. 1, the letters AR designate the rearward direction of the tube whereas the letters AV designate the forward direction of the tube, the axis of which bears the reference numeral 5.

Figure 4:
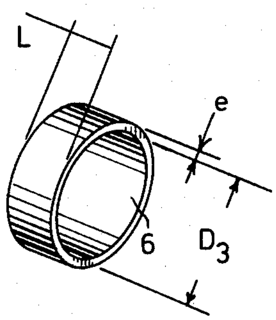
FIGS. 4 and 5 are perspective views showing respectively the ring which forms a static convergence correction unit and the elastic positioning collars employed in accordance with the invention.
Figure 2:
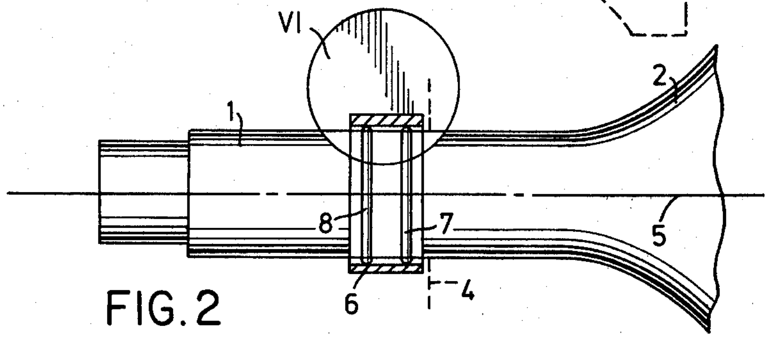
FIG. 2 is a view which is similar to FIG. 1 and shows the final stage of positioning of the device.
Figure 3:
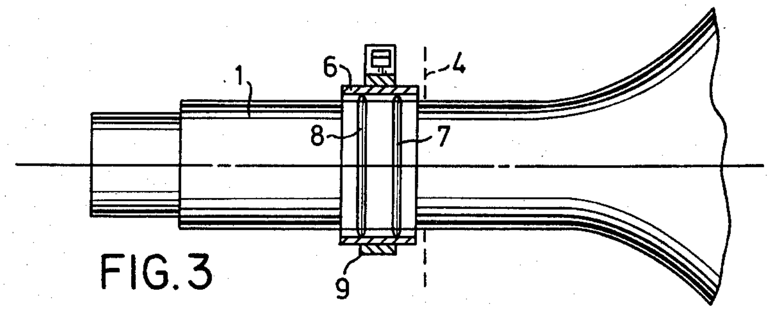
FIG. 3 shows the device as equipped in FIG. 2 but after it has been fitted with an additional correction unit.

According to the invention, a closed cylindrical ring 6 which is known per se and shown in particular in FIGS. 2 and 4 is employed as a static convergence correction unit. Said ring is advantageously formed of plastic material of suitable quality and filled with ferrite, with the result that the desired magnetic pole elements can be formed therein with a view to obtaining the desired correction of magnetic static convergence.

The problem posed in the prior art for the use of a ring of this type lay in the fact that, taking into account the manufacturing tolerances of the neck 1 of the glass tube 2 in particular, provision had to be made for a relatively substantial gap between the internal wall of a ring 6 and the external wall of the neck 1, this gap being variable from one tube to another, and no method was known for securely attaching the ring.

In contrast, this gap is turned to useful account in accordance with the invention and in the manner which will now be explained.

Figure 5:
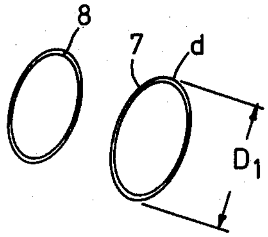

Two elastic rings or collars of rubber of suitable quality and designated respectively by the reference numerals 7 and 8 are engaged on the neck 1 of the tube behind the deflection yoke 3. The dimensions of said rings are such that their diameter D1 (as shown in FIG. 5) is distinctly smaller than the external diameter D2 of a tube neck when said rings are in the state of rest. For example, if the neck has a diameter D2 of the order of 29 millimeters, the diameter D1 of the collars 7 and 8 can be of the order of 13 to 26 millimeters. Thus the collars 7 and 8 are positioned on the neck 1 in extension and remain in position of their own accord.

Figure 6:
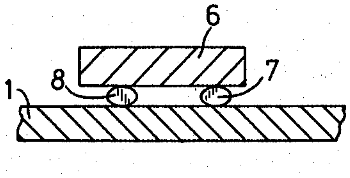
FIG. 6 is a view to a larger scale showing a detail surrounded by the circle VI in FIG. 2.

The ring 6 forming a static convergence correction unit and having an internal diameter D3 which is slightly larger than the diameter D2 (for example of the order of 30 millimeters) is then fitted over the neck 1 of the tube and over the two collars 7, 8. Having taken care to choose a sufficient thickness d of cross-section of the collars 7 and 8, for example a thickness of the order of 1 to 2 millimeters, it accordingly becomes apparent as shown more clearly in FIGS. 2 and 6 that the ring 6 can be positioned on the neck 1 over the collars 7 and 8 only with a certain degree of compression of the cross-section of said collars, thus perfectly ensuring at the same time both axial and diametrical positioning of the ring 6 on the neck 1. To give an example in which the mean diameter D2 of the tube neck 1 is 29 millimeters, a mean internal diameter of 30 millimeters could be chosen for the ring 6, thus providing a mean diametral gap of 1 millimeter which makes it possible to accommodate normal manufacturing tolerances. Under these conditions, it will prove advantageous to choose a thickness d of cross-section of the collars of the order of 1.5 to 2 millimeters in order to obtain a sufficient degree of compression of said collars at the time of fitting of the static convergence correction unit 6 in position. It will be noted that, if the manufacturing tolerances of the tubes exceed one millimeter with respect to the value of the neck diameter, provision can be made for a set of several correction rings 6 having diameters which increase in steps of one millimeter. The particular ring which is nearest in size, that is, which has the smallest diameter D3 but larger than the tube diameter D2 will thus be adapted each time to the neck of the tube. Under these conditions, the collars 7, 8 can be standard collars.

In view of the fact that this portion of the tube neck is relatively hot when the tube is in operation, the collars 7, 8 will advantageously consist of a silicone elastomer, the following characteristics of which are given by way of example:

hardness: 50 degrees Shore,
load at rupture: 75 kg/cm$^2$,
elongation at rupture: 400%.

By way of example, it will be mentioned that the normal thickness e of the ring 6 can be of the order of 1.5 millimeter or more while the length L of the ring varies as a function of the type of tube to be equipped.

The ring 6 is advantageously fitted in position on the neck 1 of the tube as illustrated in FIG. 2 and prior to magnetization of said ring. When the ring is in position, the technique of centering the three electron beams is then carried out in a conventional magnetizing machine. When good centering has been obtained, concordant magnetization of the ring 6 is carried out by forming the pole faces therein at the desired locations. Static convergence correction is then finally obtained and there is no further need to carry out any subsequent operation for fixing the ring 6 in position.

A further advantage of the invention as illustrated in FIG. 3 lies in the possibility of fitting an additional correcting ring 9 over the ring 6. This additional ring can be fixed in position around the first ring in accordance with conventional practice and in the same manner as a non-magnetic clamping collar. By way of example, the collar or ring 9 can be adapted to carry small correcting magnets.

Among the advantages obtained in accordance with the invention, the following are particularly worthy of note:

(a) since the ring 6 is a closed cylinder, there is no air-gap which would be liable to have an adverse effect on the good operation of the device;

(b) the ring 6 can be fabricated in an extremely economical manner and in accordance with simple standards of manufacture; if so required, provision can also be made for several ring diameters;

(c) the magnetizing coils of the ring-magnetizing machines will always be at a predetermined distance from the ring 6, thus resulting in perfect constancy of magnetization and permitting perfect magnetic balancing;

(d) the distance between the magnetizing coils of the magnetizing machine and the ring 6 can be reduced, thus achieving enhanced efficiency of the machine;

(e) additional correcting devices can be applied over the static convergence correction ring which is mounted according to the invention;

(f) the device is conducive to economical manufacture and maintenance while the ring itself may be removed and used again if so required.

Figure 7:
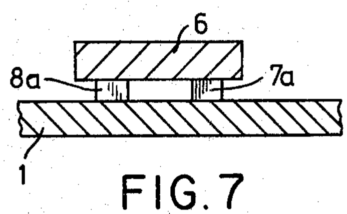
FIG. 7 is a view similar to FIG. 6 but showing elastic collars of square cross section.

In regard to the structure of the collars or rings 7, 8, it will be noted that these collars can have a circular or elliptical cross-section as illustrated in FIGS. 1–3 and 4–6. If necessary, they can be given a rectangular or square cross-section as shown in FIG. 7 wherein the collars are indicated as *7a* and *8a*. However, by making provision for cross-sections having either a circular shape or rounded corners, the introduction and good positioning of the ring 6 over the collars will usually be facilitated.

Two collars are preferably employed, said collars being placed with respect to each other at a distance which is slightly shorter than the length L of the ring 6, thus permitting the achievement of perfect results.

What is claimed is:

1. A method for positioning and fixing the static convergence correction unit on the neck of a color television tube, wherein at least one and preferably two elastic collars having a small and uniform thickness of the order of one to two millimeters are mounted in extension around the neck at the rear end of the tube behind the deflection yoke and said static convergence correction unit is slidably fitted over said two elastic collars, said correction unit being designed in the form of a cylindrical ring whose internal diameter is chosen so as to permit engagement of said ring over said neck with a predetermined clearance and to cause compression of the elastic collars when the static convergence correction unit is brought to the desired position on said neck and over said collars, thus ensuring accurate positioning of said ring on said neck.

2. A method according to claim 1, wherein two collars are employed and placed in spaced relation in the desired position on the neck of the tube, the distance between the two spaced collars being slightly shorter than the length of said ring as measured in the direction of its axis.

3. A method according to claim 1 or 2, wherein said static convergence correction unit is formed as a closed cylindrical ring of plastic material filled with ferrite.

4. A method according to claim 1, wherein the desired magnetization of the cylindrical ring is carried out when said ring is in position on the neck of the tube.

5. A static convergence correction unit for TV tubes comprising:

a closed cylindrical ring of ferrite-filled plastic material having an internal diameter which is slightly larger than the external diameter of the neck of the tube to be equipped with said ring, at least one and preferably two elastic collars of substantially uniform cross section and heat-resistant elastomeric material such as silicone rubber having a diameter in the state of rest which is smaller than the external diameter of the neck and having a small cross-section of approximately one to two millimeters, in the ensured accurate position in which it is mounted on the tube, said correction unit is positioned on the neck of the tube over said elastic collars which are compressed between the oppositely-facing walls of said unit and of said neck.

6. A device according to claim 5, wherein said rings have a substantially circular rounded cross-section.

7. A device according to claim 5, wherein said rings have a substantially elliptical rounded cross-section.

8. A device according to claim 5, wherein said rings have a substantially rectangular or square cross-section.

* * * * *